US009418625B2

(12) United States Patent
Zhang (10) Patent No.: US 9,418,625 B2
(45) Date of Patent: Aug. 16, 2016

(54) RESOLUTION LOSS MITIGATION FOR 3D DISPLAYS

(75) Inventor: Yanli Zhang, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 332 days.

(21) Appl. No.: 13/977,173

(22) PCT Filed: Dec. 16, 2011

(86) PCT No.: PCT/US2011/065403
§ 371 (c)(1),
(2), (4) Date: Jun. 28, 2013

(87) PCT Pub. No.: WO2013/089770
PCT Pub. Date: Jun. 20, 2013

(65) Prior Publication Data
US 2013/0278616 A1    Oct. 24, 2013

(51) Int. Cl.
*G09G 5/39* (2006.01)
*G09G 5/14* (2006.01)
*H04N 13/00* (2006.01)
*H04N 13/04* (2006.01)

(52) U.S. Cl.
CPC ............. *G09G 5/14* (2013.01); *H04N 13/0029* (2013.01); *H04N 13/0497* (2013.01)

(58) Field of Classification Search
CPC ............... G02B 27/22–27/26; H04N 13/0055; H04N 13/0438; H04N 13/0497
See application file for complete search history.

(56) References Cited

U.S. PATENT DOCUMENTS

| 5,640,171 | A | 6/1997 | Shimada |
| 7,319,720 | B2* | 1/2008 | Abrams, Jr. ............... 375/240.12 |
| 7,692,642 | B2* | 4/2010 | Wyatt ............................. 345/211 |
| 7,710,648 | B2 | 5/2010 | Chestak et al. |
| 8,421,851 | B2* | 4/2013 | Hardacker ...................... 348/53 |
| 2003/0117489 | A1* | 6/2003 | Jones et al. .................... 348/51 |
| 2004/0178969 | A1 | 9/2004 | Zhang et al. |
| 2010/0177161 | A1* | 7/2010 | Curtis et al. ................... 348/43 |
| 2010/0188399 | A1* | 7/2010 | Shestak et al. ................ 345/419 |

(Continued)

FOREIGN PATENT DOCUMENTS

| CN | 101374244 A | 2/2009 |
| KR | 20040084874 A | 10/2004 |
| WO | 2011/100735 A1 | 8/2011 |
| WO | 2013/089770 A1 | 6/2013 |

OTHER PUBLICATIONS

International Preliminary Report on Patentability and Written Opinion received for PCT Patent Application No. PCT/US2011/065403, mailed on Jun. 26, 2014, 5 pages.

(Continued)

*Primary Examiner* — Charles Tseng
(74) *Attorney, Agent, or Firm* — Lynch Law Patent Group, P.C.

(57) ABSTRACT

Systems, devices and methods are described including determining a display type and a display mode, preparing stereoscopic image content in response to the display mode, where preparing the stereoscopic image content includes storing a full resolution left image and a full resolution right image in memory, and determining a display refresh rate in response to at least a content frame rate of the stereoscopic image content. The stereoscopic image content may then be processed for display according to the display type, the display refresh rate, and a power policy.

24 Claims, 5 Drawing Sheets

(56) References Cited

U.S. PATENT DOCUMENTS

| | | | |
|---|---|---|---|
| 2010/0260268 A1* | 10/2010 | Cowan et al. | 375/240.25 |
| 2011/0032346 A1* | 2/2011 | Kleinberger | 348/59 |
| 2011/0164122 A1* | 7/2011 | Hardacker | 348/53 |
| 2011/0211049 A1* | 9/2011 | Bassali et al. | 348/51 |
| 2011/0242292 A1 | 10/2011 | Kato | |
| 2012/0038758 A1* | 2/2012 | Khassanov et al. | 348/60 |
| 2012/0169714 A1* | 7/2012 | Hsu et al. | 345/419 |

OTHER PUBLICATIONS

International Search Report and Written opinion for PCT Patent Application No. PCT/US2011/065403, mailed on Sep. 12, 2012, 8 pages.

First Office Action and Search Report for CN Patent Application No. 201180075565.0, mailed on Sep. 28, 2015, 6 pages.

* cited by examiner

RESOLUTION LOSS MITIGATION FOR 3D DISPLAYS

BACKGROUND

Polarization based stereoscopic displays and auto-stereoscopic displays all suffer from resolution loss. Polarization based stereoscopic displays operate by modulating each row of the display in opposite polarization directions. When viewed using glasses incorporating passive polarizers only half of the screen content goes to each eye resulting in 50% resolution loss.

Auto stereoscopic displays work by spatially separating the light rays emanating from the display. For single-view auto stereoscopic displays, resolution loss is 50%. For multi-view auto stereoscopic display, the resolution loss increases as a function of the number of views provided. One type of auto stereoscopic display is parallax barrier based. Parallax barrier based displays employ an active switching barrier layer to alternately direct light to the right and left eyes on a per-frame basis.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Figure 1:
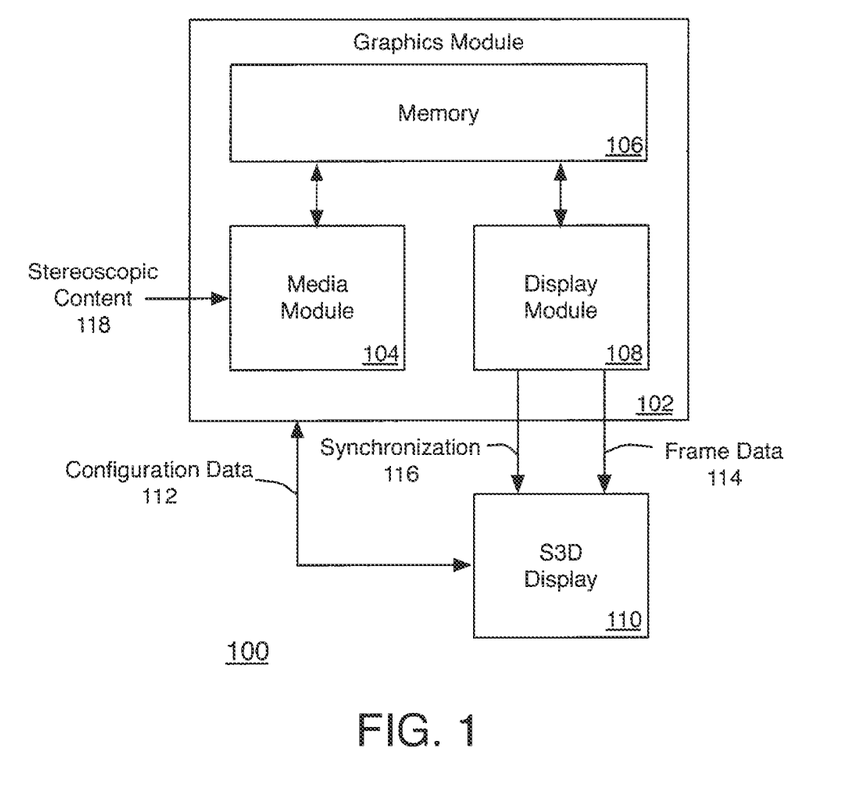
FIG. 1 is an illustrative diagram of an example system.

FIG. 1 illustrates an example system 100 in accordance with the present disclosure. In various implementations, system 100 includes a graphics module 102 including a media module 104, a memory 106 and a display module 108. Graphics module 102 is operatively and communicatively coupled to a stereoscopic three-dimensional (S3D) display 110 such as a polarization based stereoscopic display or an auto stereoscopic display such as a parallax barrier based display. In various implementations, as will be explained in greater detail below, configuration data 112 may be exchanged between module 102 and display 110. Further, as will also be explained in greater detail below, display module 108 may retrieve image content from memory 106, may format that image content for display, and may provide the image content to display 110 in the form of frame data 114. When doing so, display module 108 may provide a synchronization signal 116 to display 110 to aid in the rendering of frame data 114 as will be explained in greater detail below.

As will be explained in greater detail below, when graphics module 102 determines the type of display 110, and determines, based on a display mode of display 110, that display 110 is prepared to receive stereoscopic image content 118, module 102 may use media module 104 to prepare stereoscopic image content 118 for display. Media module 104 may do so by storing full resolution left and right images of content 118 in memory 106. Then, depending on at least a frame rate of stereoscopic image content 118, module 102 may determine a refresh rate to be used when displaying stereoscopic image content 118 on display 110. Further, in response to the type of display 110, display module 108 may process stereoscopic image content 118.

Media module 104 and display module 108 may be implemented by any combination of software, firmware and/or hardware. Thus, in various implementations, hardware logic such as a hardware engine may provide the functionality of media module 104 and/or display module 108 as described herein, while, in other implementations, modules 104 and/or 108 may be implemented by software such as driver software.

In various implementations, memory 106 may be any type of memory device or devices including volatile memory such as any type of Static Random Access Memory (SRAM), any type of Dynamic Random Access Memory (DRAM), and so forth. In various implementations, display 110 may be any type of S3D display such as, but not limited to, a polarization based display, a parallax barrier based display, and so forth.

In various embodiments, a video and/or media processor may implement graphics module 102. In general, various components of system 100 may be implemented in software, firmware, and/or hardware and/or any combination thereof. For example, various components of system 100 may be provided, at least in part, by hardware of a computing system-on-a-chip (SoC) such as may be found in a computing system, consumer electronics (CE) device or the like. In various implementations, module 102 may be provided by software and/or firmware instructions executed by processing logic such as one or more central processing unit (CPU) processor cores, a digital signal processor (DSP), an application specific integrated circuit (ASIC), a Fully Programmable Gate Array (FPGA), and so forth.

Figure 2:
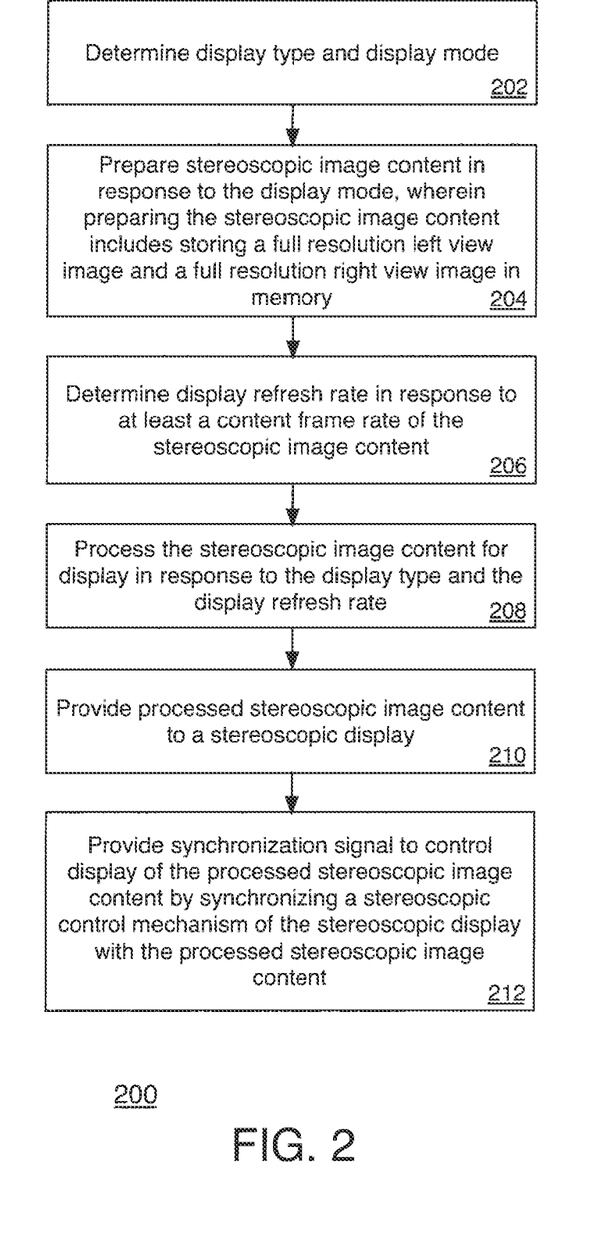
FIG. 2 is a flow diagram illustrating an example process.

FIG. 2 illustrates a flow diagram of an example process 200 according to various implementations of the present disclosure. Process 200 may include one or more operations, functions or actions as illustrated by one or more of blocks 202, 204, 206, 210 and 212 of FIG. 2. By way of non-limiting example, process 200 will be described herein with reference to example system 100 of FIG. 1.

Process 200 may begin at block 202 where a display type and a display mode may be determined. In various implementations, block 202 may correspond to display 110 providing configuration data 112 to module 102 where data 112 may include at least display type data and display mode data for display 110. In various embodiments, display type data may indicate that display 110 is one of a polarization based S3D display or a parallax barrier based S3D display, although the present disclosure is not limited to any particular S3D display type and/or technology. In various embodiments, display mode data may indicate whether or not display 110 has 3D display capability and/or is in a 3D display mode. In some embodiments, block 202 may involve module 102 obtaining configuration data 112 from display 110 by, for example, accessing registers (not shown) internal to display 110. In other embodiments, block 202 may involve module 102 receiving configuration data 112 from display 110 when, for example, module 102 requests that display 110 provide configuration data 112.

Figure 3:
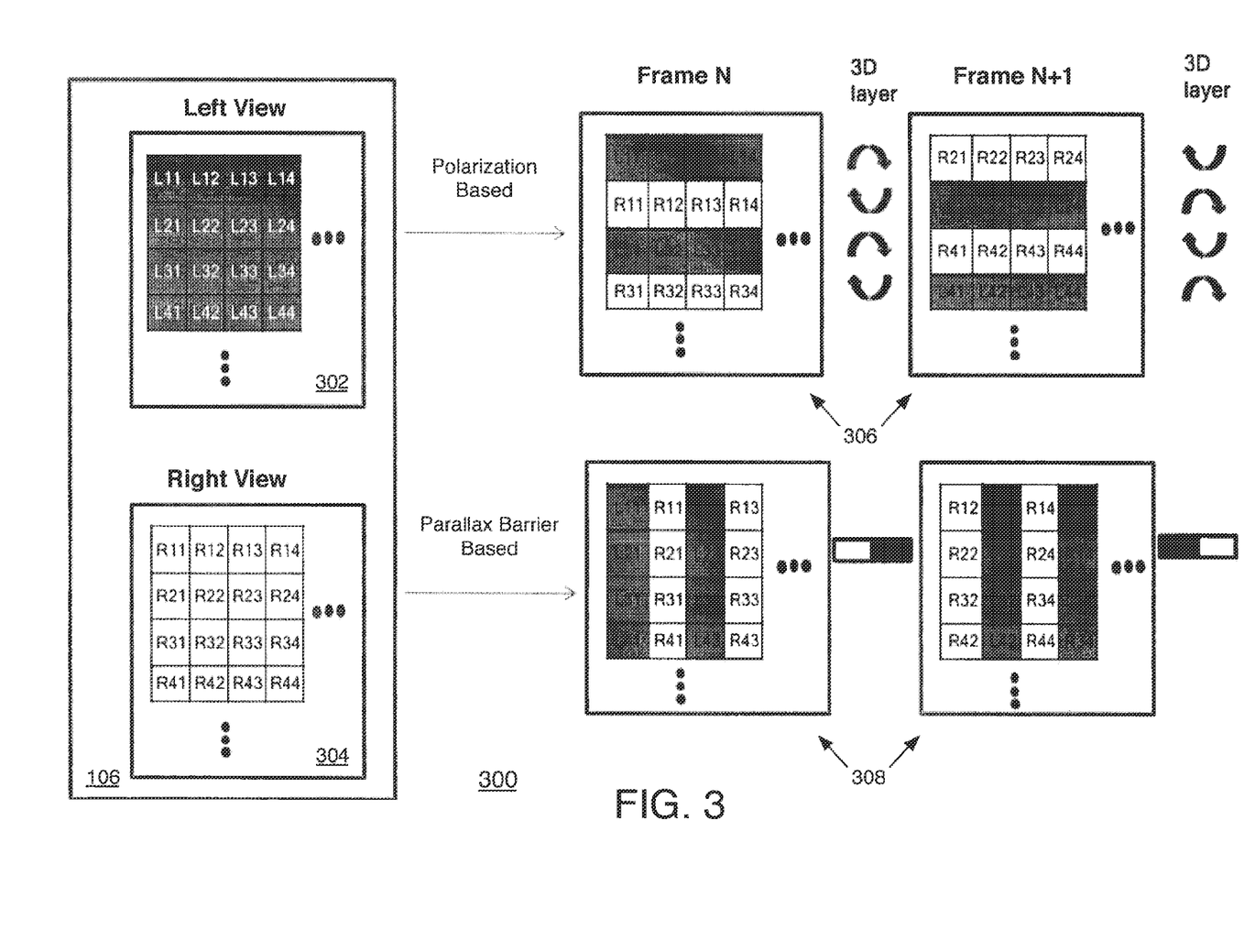
FIG. 3 is an illustrative diagram of an example scheme.

At block 204, stereoscopic image content may be prepared in response to the display mode, wherein preparing the stereoscopic image content includes storing a full resolution left view image and a full resolution right view image in memory. In various implementations, if the display mode indicates that display 110 is in a 3D display mode and hence is ready to receive content 118, block 204 may involve media module 104 writing content 118 in the form of a full resolution left view image and a full resolution right view image in memory 106. For example, FIG. 3 illustrates a scheme 300 in accordance with the present disclosure that includes some features of system 100 depicted in the context of process 200. As depicted in scheme 300, block 204 may involve media module 104 storing a left view image 302 and a right view image 304 in memory 106. For example, stereoscopic image content 118 may include an alternating sequence of full resolution left view and right view images organized as rows and columns of pixel values as depicted by example images 302 and 304.

Process 200 may then continue at block 206 where a display refresh rate may be determined in response to at least a content frame rate of the stereoscopic image content. In various implementations, graphics module 102 may determine a display refresh rate at block 206 in response to the frame rate of stereoscopic image content 118 and a power policy. Further, module 102 may determine a display refresh rate at block 206 in response to whether content 118 is progressive scanned content or interlaced content.

In various implementations, if the frame rate of content 118 is N hertz, then graphics module 102 may determine a display refresh rate of either N hertz or 2*N hertz depending on a power policy and/or whether content 118 is progressive scanned or interlaced content. In various embodiments, a power policy associated with system 100 may specify that module 102 should employ a lower display refresh rate and/or provide display content 118 in interlaced format to implement a power saving mode. Alternatively, if a power saving mode is not to be implemented, the power policy may specify that module 102 should employ a higher display refresh rate to implement an enhanced visual quality mode. For example, if content 118 has a frame rate of sixty (60) hertz and is progressive scanned, then, in an enhanced visual quality mode, module 102 may undertake block 206 by setting the display refresh rate to one-hundred twenty (120) hertz, whereas in power saving mode, module 102 may undertake block 206 by setting the display refresh rate to sixty (60) hertz. In another example, if content 118 has a frame rate of thirty (30) hertz and is progressive scanned, then module 102 may undertake block 206 by setting the display refresh rate to sixty (60) hertz while providing full resolution (e.g., as shown in FIG. 3). In addition, as will be explained further below, module 102 may, for content 118, use display module 108 to process content 118 for display by providing content 118 in interlaced format to display 110.

Process 200 may continue at block 208 where the stereoscopic image content may be processed for display in response to the display type and the display refresh rate. In various implementations, referring again to FIG. 3, in response to both the display type determined at block 202 and the display refresh rate determined at block 206, display module 108 may undertake block 208 by forming either horizontally interlaced frames 306 from alternate rows of images 302 and 304, or vertically interlaced frames 308 from alternate columns of images 302 and 304. For instance, when the display type specifies that display 110 is a polarization based S3D display, block 208 may involve display module 108 assembling frames 306 by accessing memory 106 to alternately obtain rows of pixel values of images 302 and 304. Alternatively, when the display type specifies that display 110 is, for example, a parallax barrier based S3D display, block 208 may involve display module 108 assembling frames 308 by accessing memory 106 to alternately obtain columns of pixel values of images 302 and 304.

At block 210, the processed stereoscopic image content may be provided to a stereoscopic display. In various implementations, display module 108 may provide the processed image content to display 110 at block 210. For example, if display 110 is a polarization based S3D display, module 108 may provide frames 306 in the form of frame data 114 to display 110. Alternatively, for example, if display 110 is a parallax barrier based S3D display, module 108 may provide frames 308 in the form of frame data 114 to display 110.

When doing so, module 108 may provide frames 306 or 308 to display 110 at the display refresh rate as determined in block 206.

Process 200 may conclude at block 212 where a synchronization signal may be provided to control display of the processed stereoscopic image content by synchronizing a stereoscopic control mechanism of the stereoscopic display with the processed stereoscopic image content. In various implementations, display module 108 may undertake block 212 by providing synchronization signal 116 to display 110. For example, synchronization signal 116 may have the same frequency as the display refresh rate determined in block 206 and may be used to control a stereoscopic control mechanism of display 110 in synchronization with the image content provided at block 210. For example, the stereoscopic control mechanism of display 110 may be controlled using synchronization signal 116 so that display 110 provides two image views (e.g., corresponding to the left view image 302 and right view image 304 of FIG. 3) by either spatially separating the views (e.g., by using parallax barriers) or by using polarization to separate the views.

For instance, if display 110 is a polarization based S3D display, block 212 may involve using synchronization signal 116 to control an active retarder/polarization layer of display 110 to modulate each row of display 110 in opposite polarization directions in successive frames 306 (e.g., in one polarization direction for frame N, and in the other polarization direction for frame N+1). Alternatively, for example, if display 110 is a parallax barrier based S3D display, block 212 may involve using synchronization signal 116 to control parallax barriers internal to display 110 in order to modulate each column of display 110 in response to frames 308.

While implementation of example process 200, as illustrated in FIG. 2, may include the undertaking of all blocks shown in the order illustrated, the present disclosure is not limited in this regard and, in various examples, implementation of process 200 may include the undertaking only a subset of the blocks shown and/or in a different order than illustrated.

In addition, any one or more of the blocks of FIG. 2 may be undertaken in response to instructions provided by one or more computer program products. Such program products may include signal beating media providing instructions that, when executed by, for example, a processor, may provide the functionality described herein. The computer program products may be provided in any form of computer readable medium. Thus, for example, a processor including one or more processor core(s) may undertake one or more of the blocks shown in FIG. 2 in response to instructions conveyed to the processor by a computer readable medium.

As used in any implementation described herein, the term "module" refers to any combination of software, firmware and/or hardware logic configured to provide the functionality described herein. The software logic may be embodied as a software package, code and/or instruction set or instructions, and "hardware", as used in any implementation described herein, may include, for example, singly or in any combination, hardware logic such as hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
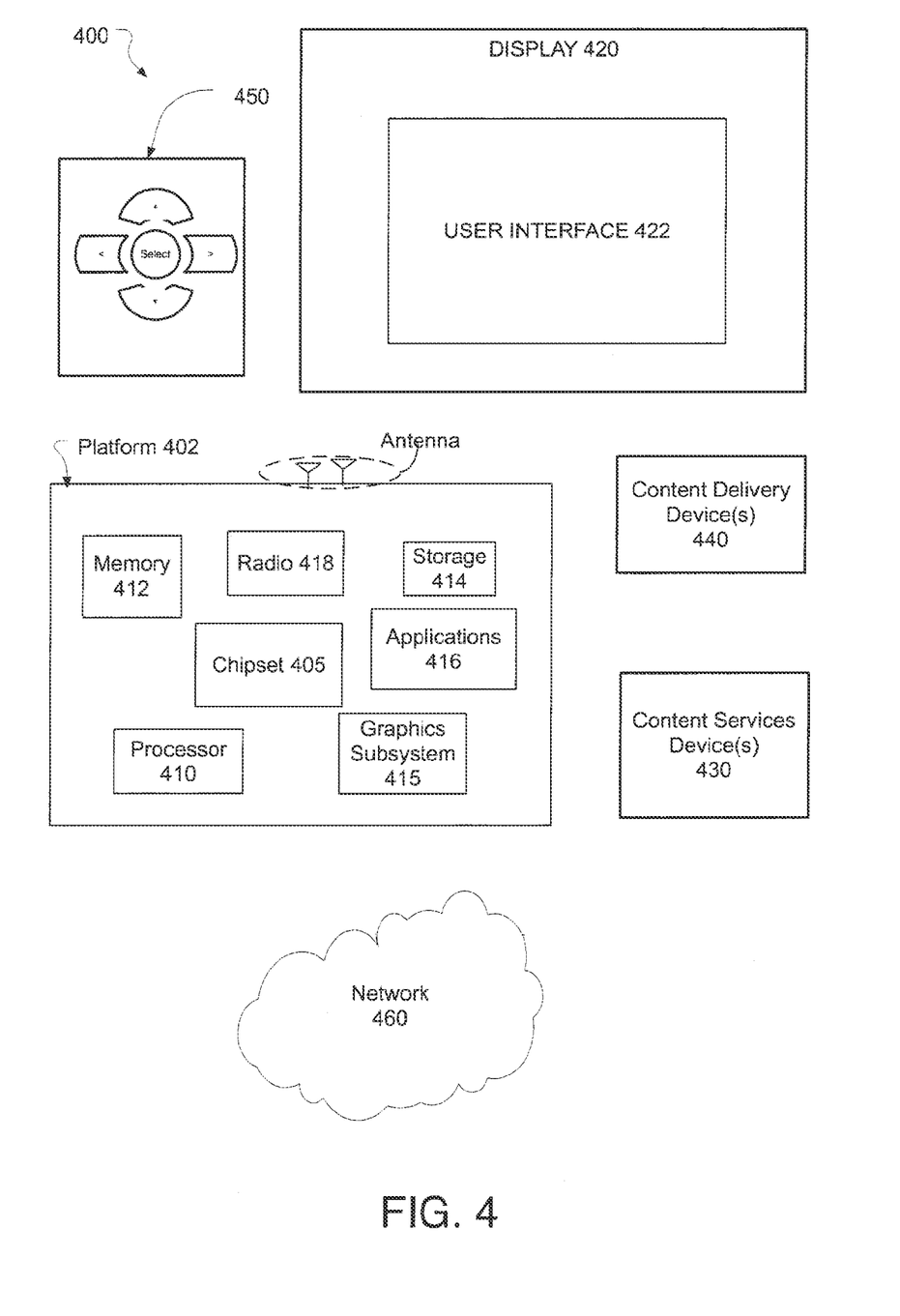
FIG. 4 is an illustrative diagram of an example system.

FIG. 4 illustrates an example system 400 in accordance with the present disclosure. In various implementations, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 400 includes a platform 402 coupled to a display 420. Platform 402 may receive content from a content device such as content services device(s) 430 or content delivery device(s) 440 or other similar content sources. A navigation controller 450 including one or more navigation features may be used to interact with, for example, platform 402 and/or display 420. Each of these components is described in greater detail below.

In various implementations, platform 402 may include any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 410 may be dual-core processor(s), dual-core mobile processor(s), and so forth.

Memory 412 may be implemented as a volatile memory device such as, but not limited to, a Random Access Memory (RAM), Dynamic Random Access Memory (DRAM), or Static RAM (SRAM).

Storage 414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 414 may include technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 may be integrated into processor 410 or chipset 405. In some implementations, graphics subsystem 415 may be a stand-alone card communicatively coupled to chipset 405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further embodiments, the functions may be implemented in a consumer electronics device.

Radio 418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In various implementations, display 420 may include any television type monitor or display. In various implementations, display 420 may be an active polarization based or active barrier based auto stereoscopic display. Display 420 may include, for example, a computer display screen, touch screen display, video monitor, television-like device, and/or a television. Display 420 may be digital and/or analog. In various implementations, display 420 may be a holographic display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display user interface 422 on display 420.

In various implementations, content services device(s) 430 may be hosted by any national, international and/or independent service and thus accessible to platform 402 via the Internet, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420.

In various implementations, content services device(s) 430 may include a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, medical and gaming information, and so forth.

Content services device(s) 430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 402 may receive control signals from navigation controller 450 having one or more navigation features. The navigation features of controller 450 may be used to interact with user interface 422, for example. In embodiments, navigation controller 450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 may be replicated on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In embodiments, controller 450 may not be a separate component but may be integrated into platform 402 and/or display 420. The present disclosure, however, is not limited to the elements or in the context shown or described herein.

In various implementations, drivers (not shown) may include technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 even when the platform is turned "off." In addition, chipset 405 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 400 may be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the present disclosure.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RE spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
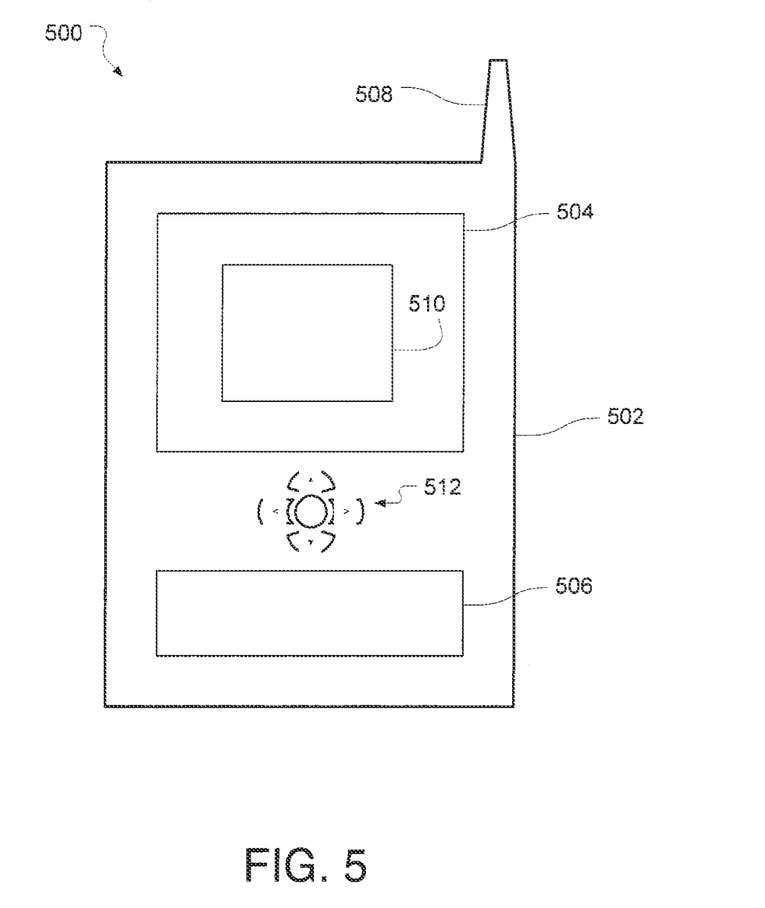
FIG. 5 illustrates an example device, all arranged in accordance with at least some implementations of the present disclosure.

As described above, system 400 may be embodied in varying physical styles or form factors. FIG. 5 illustrates implementations of a small form factor device 500 in which system 400 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 500 may include a housing 502, a display 504, an input/output (I/O) device 506, and an antenna 508. Device 500 also may include navigation features 512. Display 504 may include any suitable display unit for displaying information appropriate for a mobile computing device. In various implementations, display 504 may be a active polarization based, active barrier based, or lenticular lens auto stereoscopic display. I/O device 506 may include any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A computer-implemented method, comprising:
   determining a display type and a display mode;
   preparing stereoscopic image content in response to the display mode, wherein preparing the stereoscopic image content includes storing a full resolution left view image and a full resolution right view image in memory;
   determining a display refresh rate in response to at least a content frame rate of the stereoscopic image content; and
   processing the stereoscopic image content for display in response to the display type and the display refresh rate, wherein when the display type comprises a polarization based S3D display type, processing the stereoscopic image content for display comprises interleaving rows of the full resolution left view image with rows of the full resolution right view image to generate at least two image frames N and N+1 of interleaved rows; and wherein when the display type comprises an auto stereoscopic based S3D display type, processing the stereoscopic image content for display comprises interleaving columns of the full resolution left view image with columns of the full resolution right view image to generate at least two image frames N and N+1 of interleaved columns.

2. The method of claim 1, wherein when the stereoscopic image content has a content frame rate of N hertz, the display refresh rate comprises 2*N hertz.

3. The method of claim 1, further comprising:
   providing the processed stereoscopic image content to a stereoscopic display; and
   providing a synchronization signal to control display of the processed stereoscopic image content by synchronizing a stereoscopic control mechanism of the stereoscopic display with the processed stereoscopic image content, wherein the synchronization signal controls the stereoscopic display to modulate each row or column of the stereoscopic display in opposite polarization directions in successive frames so that a given row or column has a first polarization direction for frame N and the same given row or column has a second different polarization direction for frame N+1.

4. The method of claim 3, wherein when providing the processed stereoscopic image content comprises providing the processed stereoscopic image content as progressive frames having a frame rate of N hertz, the display refresh rate comprises 2*N hertz, and the synchronization signal comprises a rate of 2*N hertz.

5. The method of claim 3, wherein when providing the processed stereoscopic image content comprises providing the processed stereoscopic image content as interlaced frames having a frame rate of N hertz, the display refresh rate comprises N hertz, and the synchronization signal comprises a rate of N hertz.

6. The method of claim 1, wherein the display mode comprises an indication of three-dimensional (3D) display capability.

7. The method of claim 1, wherein the display type comprises one of a polarization based stereoscopic three-dimensional (S3D) display type, or a parallax barrier based S3D display type.

8. The method of claim 1, wherein determining the display refresh rate is further in response to at least whether the stereoscopic image content is progressive scanned or interlaced content, and whether a power saving mode has been activated according to a power policy.

9. At least one non-transitory machine readable medium comprising a plurality of instructions that in response to being executed on a computing device, cause the computing device to:

determining a display type and a display mode;

preparing stereoscopic image content in response to the display mode, wherein preparing the stereoscopic image content includes storing a full resolution left view image and a full resolution right view image in memory;

determining a display refresh rate in response to at least a content frame rate of the stereoscopic image content; and processing the stereoscopic image content for display in response to the display type and the display refresh rate, wherein when the display type comprises a polarization based S3D display type, processing the stereoscopic image content for display comprises interleaving rows of the full resolution left view image with rows of the full resolution right view image to generate at least two image frames N and N+1 of interleaved rows; and wherein when the display type comprises an auto stereoscopic based S3D display type, processing the stereoscopic image content for display comprises interleaving columns of the full resolution left view image with columns of the full resolution right view image to generate at least two image frames N and N+1 of interleaved columns.

10. The non-transitory machine readable medium of claim 9, wherein when the stereoscopic image content has a content frame rate of N hertz, the display refresh rate comprises 2*N hertz.

11. The non-transitory machine readable medium of claim 9, the computer program product having stored therein further instructions that, if executed, result in:

providing the processed stereoscopic image content to a stereoscopic display; and providing a synchronization signal to control display of the processed stereoscopic image content by synchronizing a stereoscopic control mechanism of the stereoscopic display with the processed stereoscopic image content, wherein the synchronization signal controls the stereoscopic display to modulate each row or column of the stereoscopic display in opposite polarization directions in successive frames so that a given row or column has a first polarization direction for frame N and the same given row or column has a second different polarization direction for frame N+1.

12. The non-transitory machine readable medium of claim 9, wherein determining the display refresh rate is further in response to at least whether the stereoscopic image content is progressive scanned or interlaced content, and whether a power saving mode has been activated according to a power policy.

13. A device, comprising:

means for determining a display type and a display mode;

means for preparing stereoscopic image content in response to the display mode, wherein preparing the stereoscopic image content includes storing a full resolution left view image and a full resolution right view image in memory;

means for determining a display refresh rate in response to at least a content frame rate of the stereoscopic image content; and means for processing the stereoscopic image content for display in response to the display type and the display refresh rate, wherein when the display type comprises a polarization based S3D display type, the process of the stereoscopic image content for display comprises interleaving rows of the full resolution left view image with rows of the full resolution right view image to generate at least two image frames N and N+1 of interleaved rows; and wherein when the display type comprises an auto stereoscopic based S3D display type, the process of the stereoscopic image content for display comprises interleaving columns of the full resolution left view image with columns of the full resolution right view image to generate at least two image frames N and N+1 of interleaved columns.

14. The device of claim 13, wherein when the stereoscopic image content has a content frame rate of N hertz, the display refresh rate comprises 2*N hertz.

15. The device of claim 13, further comprising:

means for providing the processed stereoscopic image content to a stereoscopic display; and means for providing a synchronization signal to control display of the processed stereoscopic image content by synchronizing a stereoscopic control mechanism of the stereoscopic display with the processed stereoscopic image content, wherein the synchronization signal controls the stereoscopic display to modulate each row or column of the stereoscopic display in opposite polarization directions in successive frames so that a given row or column has a first polarization direction for frame N and the same given row or column has a second different polarization direction for frame N+1.

16. The device of claim 15, wherein when providing the processed stereoscopic image content comprises providing the processed stereoscopic image content as progressive frames having a frame rate of N hertz, the display refresh rate comprises 2*N hertz, and the synchronization signal comprises a rate of 2*N hertz.

17. The device of claim 15, wherein when providing the processed stereoscopic image content comprises providing the processed stereoscopic image content as interlaced frames having a frame rate of N hertz, the display refresh rate comprises N hertz, and the synchronization signal comprises a rate of N hertz.

18. The device of claim 13, wherein the determination of the display refresh rate is further in response to at least whether the stereoscopic image content is progressive scanned or interlaced content, and whether a power saving mode has been activated according to a power policy.

19. A system comprising:
a stereoscopic display; and
a module communicatively and operably coupled to the stereoscopic display, the module to:
determine a display type and a display mode,
prepare stereoscopic image content in response to the display mode, wherein preparing the stereoscopic image content includes storing a full resolution left view image and a full resolution right view image in memory,
determine a display refresh rate in response to at least a content frame rate of the stereoscopic image content; and
process the stereoscopic image content for display in response to the display type and the display refresh rate, wherein when the display type comprises a polarization based S3D display type, the process of the stereoscopic image content for display comprises interleaving rows of the full resolution left view image with rows of the full resolution right view image to generate at least two image frames N and N+1 of interleaved rows; and wherein when the display type comprises an auto stereoscopic based S3D display type, the process of the stereoscopic image content for display comprises interleaving columns of the full resolution left view image with columns of the full resolution right view image to generate at least two image frames N and N+1 of interleaved columns.

20. The system of claim 19, wherein when the stereoscopic image content has a content frame rate of N hertz, the display refresh rate comprises 2*N hertz.

21. The system of claim 19, the module to provide the processed stereoscopic image content to the stereoscopic display, and provide a synchronization signal to control display of the processed stereoscopic image content by synchronizing a stereoscopic control mechanism of the stereoscopic display with the processed stereoscopic image content,
wherein the synchronization signal controls the stereoscopic display to modulate each row or column of the stereoscopic display in opposite polarization directions in successive frames so that a given row or column has a first polarization direction for frame N and the same given row or column has a second different polarization direction for frame N+1.

22. The system of claim 21, wherein when providing the processed stereoscopic image content comprises providing the processed stereoscopic image content as progressive frames having a frame rate of N hertz, the display refresh rate comprises 2*N hertz, and the synchronization signal comprises a rate of 2*N hertz.

23. The system of claim 21, wherein when providing the processed stereoscopic image content comprises providing the processed stereoscopic image content as interlaced frames having a frame rate of N hertz, the display refresh rate comprises N hertz, and the synchronization signal comprises a rate of N hertz.

24. The system of claim 19, wherein the determination of the display refresh rate is further in response to at least whether the stereoscopic image content is progressive scanned or interlaced content, and whether a power saving mode has been activated according to a power policy.

* * * * *